No. 696,808. Patented Apr. 1, 1902.
R. J. GATLING.
MOTOR PLOW.
(Application filed July 18, 1901.)
(No Model.) 3 Sheets—Sheet 1.
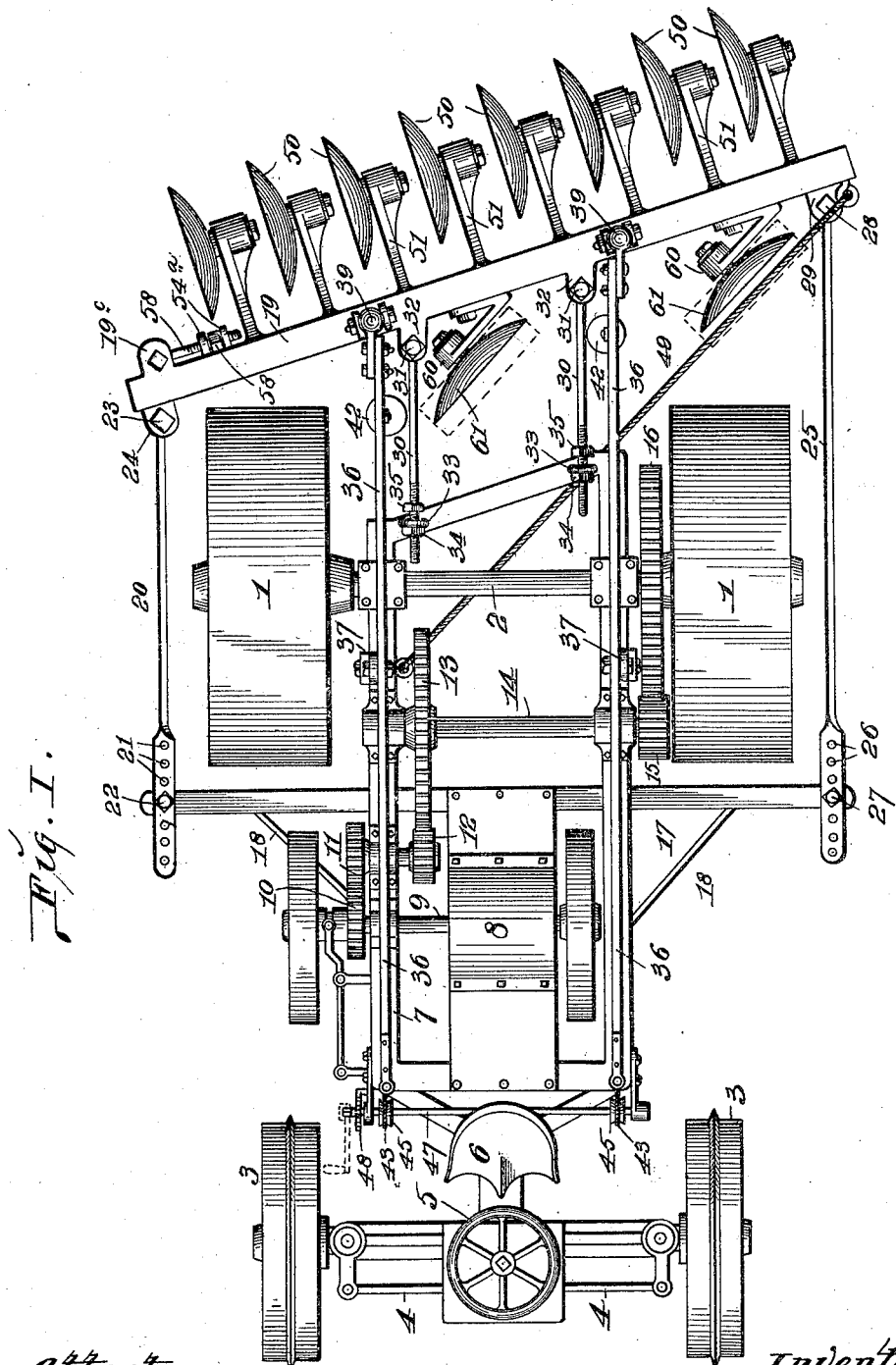
Fig. I.
attest:
M. P. Smith
E. S. Knight
Inventor:
Richard J. Gatling
By 
atty's

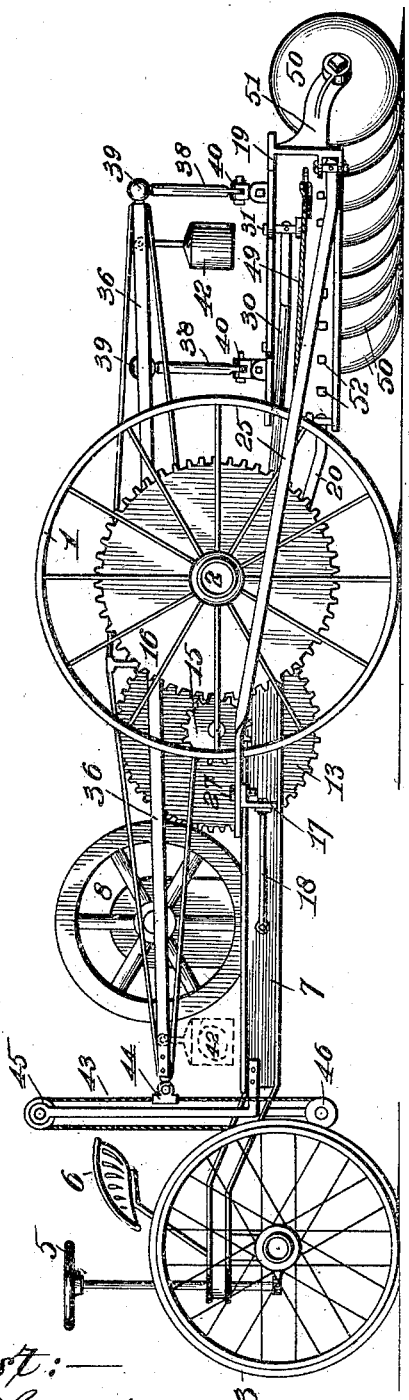

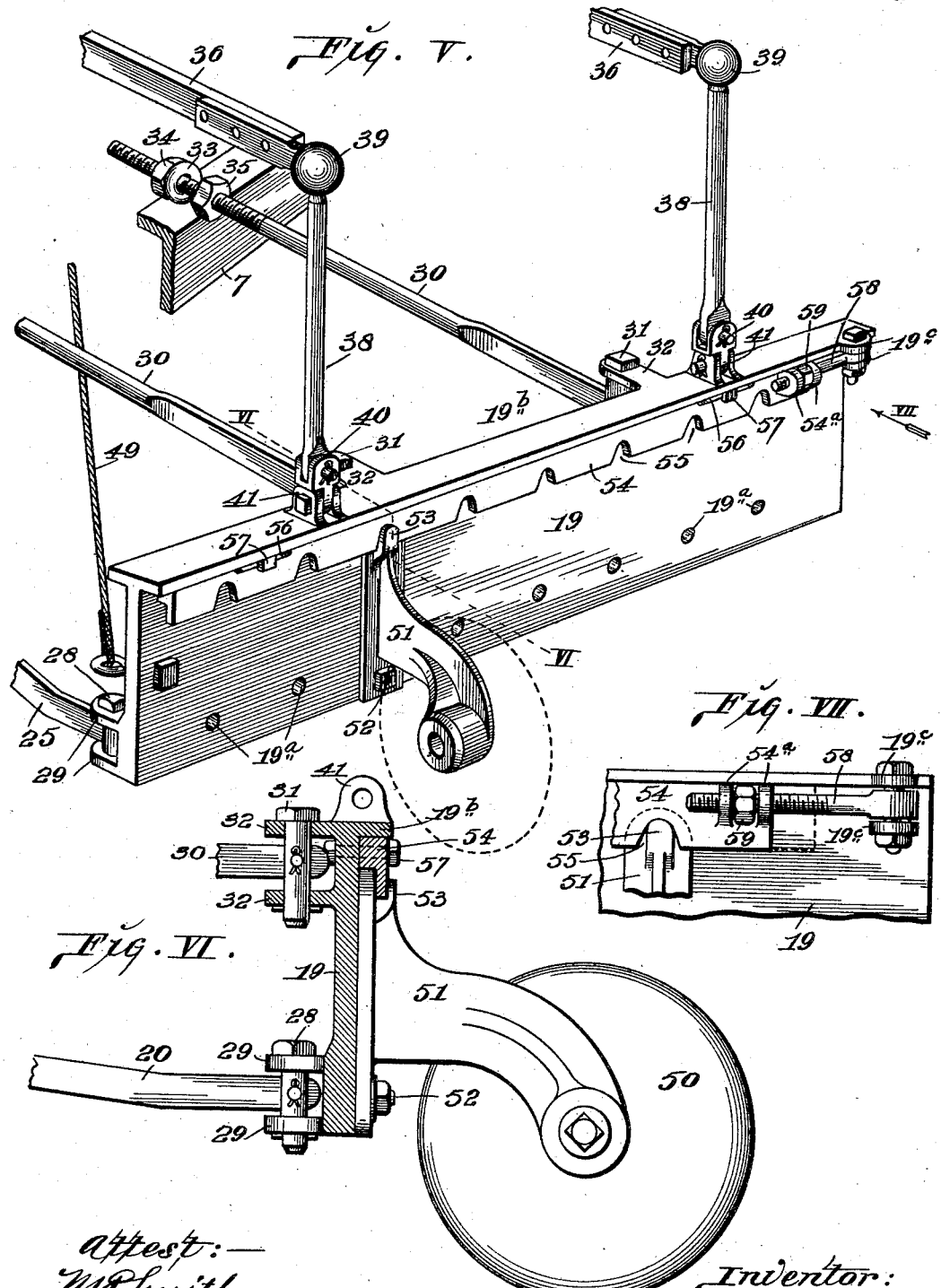

UNITED STATES PATENT OFFICE.

RICHARD J. GATLING, OF ST. LOUIS, MISSOURI.

MOTOR-PLOW.

SPECIFICATION forming part of Letters Patent No. 696,808, dated April 1, 1902.

Application filed July 18, 1901. Serial No. 68,712. (No model.)

*To all whom it may concern:*

Be it known that I, RICHARD J. GATLING, a citizen of the United States, residing in the city of St. Louis, in the State of Missouri, have invented certain new and useful Improvements in Motor-Plows, of which the following is a full, clear, and exact description, reference being had to the accompanying drawings, forming part of this specification.

My invention relates to that class of plows that are operated by a self-carried motor, an illustration of which is to be found in Letters Patent of the United States granted to me July 24, 1900, No. 654,243.

The principal object of this invention is to provide means whereby the plow-carrier and the individual plows arranged in gang may be adjusted at the will of the operator to determine the width of ground overturned, the width of the furrows cut by the individual plows, and the depth of the furrows made in the practical use of the implement.

The invention consists in features of novelty hereinafter fully described, and pointed out in the claims.

Figure I is a top or plan view showing my improved plow. Fig. II is a side elevation. Fig. III is an enlarged detail end view of the disk-plow carrier. Fig. IV is an enlarged detail rear view of a fragment of the plow-carrier and one of the disk plows. Fig. V is an enlarged perspective rear view of the plow-carrier and the parts by which said carrier is connected to the frame of the plow. Fig. VI is an enlarged cross-sectional view taken on the line VI VI, Fig. V, showing one of the disk plows in side view. Fig. VII is a detail rear view of a fragment of the forward end of the disk-plow carrier.

1 designates the main or traction wheels of the plow, in which the axle 2 is journaled.

3 designates the forward or steering wheels, that are operated by throw-rods 4, connected to a hand-wheel 5, through means of which the steering-wheels are manipulated by the driver, who occupies the seat 6, mounted on the frame of the plow.

7 designates the frame, that is connected to the axle of the steering-wheels at its forward end and is mounted at its rear end on the axle 2. The plow is driven by a motor 8 of any suitable description. I prefer to employ a gasolene-engine. The drive-shaft 9 of the motor 8 is connected by a train of gears 10, 11, 12, and 13 to a shaft 14, mounted on the frame 7 and which carries a pinion 15, arranged in mesh with a spur-wheel 16, fixed to the axle 2. The described gearing connection between the motor and the axle 2 provides for the transmission of power from said motor to said axle to drive the main or traction wheels 1 for the propulsion of the implement over the ground being plowed.

17 designates a cross-bar attached to the frame 7 at a position forward of the traction-wheels 1 and having its ends projecting beyond the rims of said traction-wheels. The cross-bar is connected to the frame 7 by forwardly-extending braces 18.

19 designates a carrier-beam, preferably of T-plate form, positioned in the rear of the traction-wheels 1 and at an angle to the axle 2, as clearly seen in Fig. I, so that one end travels in advance of the other end. The forward end of the carrier 19 is joined to the cross-bar 17 by a connecting-rod 20, provided with a series of apertures 21, that receive a bolt 22, by which the connecting-rod is adjustably held to the cross-bar 17. (See Fig. I.) The rear end of the connecting-rod 20 is mounted in a slotted swivel-bolt 23, loosely seated in a pair of ears 24, that project forwardly from the front face of the carrier 19, near the lower edge thereof. The rear end of the carrier 19 is joined to the cross-bar 17 by a connecting-rod 25, provided with a series of apertures 26, that receive the bolt 27, by which the connecting-rod, and consequently the rear end of the carrier, is adjustably connected to the cross-bar 17. The rear end of the connecting-rod 25 is mounted in a slotted swivel-bolt 28, loosely seated in a pair of ears 29, projecting forwardly from the carrier 19, near the lower edge thereof.

30 designates a pair of stay-rods that connect the carrier 19 to the frame 7. The rear ends of these rods 30 are pivotally mounted in slotted swivel-bolts 31, seated in ears 32, that project forwardly from the carrier 19 at its upper edge. The forward ends of the rods 30 are screw-threaded and pass loosely through eyes 33, mounted on the rear end of the frame 7. On the threaded forward ends of the rods are nuts 34 and 35 at opposite sides of the eyes, the said nuts being preferably spaced a sufficient distance apart to permit of play of the rods 30 in the eyes 33 and allow a limited endwise movement of said rods consequent upon movement of the carrier 19.

36 designates lift-beams pivotally connected to standards 37, carried by the frame 7, and which extend both forwardly and rearwardly of said standards. The rear ends of the lift-beams 36 are joined to the carrier 19 by links 38, the means of attachment between the upper ends of the links and the lift-beams being preferably ball-and-socket couplings 39, thereby allowing movement of the parts in all directions. The lower ends of the links are pivotally connected to knuckles 40, that are in turn pivotally joined to ears 41, surmounting the carrier 19, the arrangement or connection being such that free movement of the carrier with respect to the links 38 is permitted.

42 designates weights removably suspended from the lift-beams 36. These weights are designed for service in holding the carrier 19 depressed in the operation of the plow and when so used are suspended from the rear ends of the lift-beams, as seen in full lines, Fig. II, whereas when the plow is not in service but is being transported the weights are removed from the rear ends of the beams and suspended from the forward ends thereof, as illustrated in dotted lines in Fig. II, where they serve to support the carrier 19 and the plows affixed thereto. To provide for the operation of the lift-beams 36 to raise and lower the carrier 19, I employ cables 43, to which the forward ends of the beams are connected by clips 44. These cables pass over and under sheaves 45 and 46. (See Figs. I and II.) The cables 43 may be shifted on the sheaves 45 and 46 in any desirable manner, either by manual power or by power communicated from the motor 8, and when the cables are so shifted the beams 36 may be lowered or raised to the desired extent. In Fig. I, I have shown the sheaves 45 of each cable 43 mounted on a shaft 47, that is equipped with a ratchet 48 and designed to receive a crank whereby the sheaves may be turned to shift the cables.

49 designates a flexible stay, preferably of wire rope, that is connected to the frame 7 of the plow forward of the axle 2 and to the rear end of the carrier 19. This stay is designed for service in preventing endwise movement of the carrier 19 under the strain incurred in the operation of the plow.

I now come to the description of the disk plows and the means by which they are adjustably connected to the carrier 19.

50 designates the disk plows or soil-working members, the spindles of which are journaled in hangers 51. Each of the hangers 51 is connected to the carrier 19 by a pivot-bolt 52, that passes through one of the perforations 19$^a$ in said carrier, the said perforations being located on a line below the center of the carrier, as seen in Fig. V. The upper end of each hanger 51 is provided with a lug 53.

54 designates a slide-bar loosely positioned beneath the flange 19$^b$ of the carrier 19 and containing a series of notches 55, adapted to receive the lugs 53 on the hanger 51. The slide-bar 54 is sustained by supporting-bolts 57, that pass through slots 56, contained by said bar. For the purpose of adjusting the slide-bar 54 I provide a screw-threaded rod 58, having one end held between ears 19$^c$, projecting from the carrier 19, and having its opposite end screw-threaded and seated in ears 54$^a$, carried by the slide-rod. On the rod 58 between the ears 54$^a$ is an adjustment-nut 59.

In some instances, particularly in tough soils, the strain exerted against the carrier 19 by the gang of plows attached thereto may, it is obvious, have a tendency to force said carrier endwise in the direction opposite to that in which the soil is overturned. In order to counteract such tendency, I have provided means carried by the carrier at the front side thereof that will serve as retainers and offset the endwise movement of the carrier.

60 designates brackets fixed to the carrier 19, and journaled in these brackets are members 61, that may be and are preferably plow-disks, although wheels may be used in lieu of said disks, as indicated by dotted lines, Fig. I. The restraining members 61 are positioned in reverse direction to the position of the disk plows 50 and are preferably set at an incline to the carrier 19, so that they will turn in or on the ground and exert an endwise pull on the carrier in a direction opposite to that exerted by the plow.

In the practical use of this plow in tilling the soil the disk plows, with the carrier 19, are first lowered to the ground by manipulating the cables 43, so that the rear ends of the lift-beams 38 will be lowered and the disk plows caused to descend to the ground. The weights 42 being then suspended from the rear ends of the lift-beams, the implement is ready for service, and upon the motor 8 being put in operation the implement is self-propelled over the ground to be plowed. Where it is desired to cause the plow to overturn the least amount of ground at one operation, owing to the nature of the soil being tough or difficult of working, the carrier 19 is set at the least possible angle relative to the path of the implement, being adjusted to said position by setting the bolts 22 and 27 in the apertures 21 and 26 of the connecting-rods 20 and 25 in such positions that the desired angle of the carrier 19 will be obtained. In looser soils the bolts 22 and 27 may be adjusted into varying positions in the connecting-rods, so that the carrier will be moved into greater angle with reference to the path of travel, thereby providing for the overturning of a greater width of ground at a single operation, as will be obvious. When the adjustment of the connecting-rods 20 and 25 is altered and it is desired to maintain the carrier 19 in the same relative position as before, the stay-rods 30 are adjusted forwardly or rearwardly by manipulating the nuts 34 and 35 thereon. When it is desired to effect a deeper cut of the plows into the ground, the carrier 19 is tilted by manipulating the connecting-rods 20 25 and stay-rods 30 so that the lower edge of the carrier 19 projects in advance of the upper edge thereof, and the plows are thrown downwardly deeper into the ground, whereas when a lesser cut is to be made the rods 20, 25, and 30 are adjusted to place the upper edge of the carrier in advance of the lower edge, thereby raising the plows, as illustrated in Fig. III.

In different soils it is desirable to place the disk plows at varying angles, so that the amount of cut made by the plows may be regulated according to the nature of the soil. The plows are therefore so arranged that they may be shifted in unison to change their positions, the shifting being accomplished by the adjustment of the slide-bar 54. On manipulation of the adjustment-nut 59 on the bolt 58 the upper ends of the plow-carrying hangers 51 are swung in either direction desired and the plows carried therewith by reason of the engagement of the lugs 53 in the notches 55 of the slide-bar. The variation in the positions of the plows is illustrated by full and dotted lines, Fig. IV.

I claim as my invention—

1. In an agricultural implement of the character described, the combination of a frame, a carrier, a series of soil-working members connected to said carrier, and adjustment means connected to each end of said carrier and to said frame, whereby the angle of said carrier may be altered, substantially as described.

2. In an agricultural implement of the character described, the combination of a frame, a carrier, a series of soil-working members connected to said carrier, adjustment means forming connection between the ends of said carrier and said frame, and adjustable stay-rods providing connection between the carrier and frame intermediate of the ends of said carrier, substantially as described.

3. In an agricultural implement of the character described, the combination of a frame, a carrier, a series of soil-working members connected to said carrier, and adjustable connections between said carrier and frame, whereby said carrier may be tilted, substantially as described.

4. In an agricultural implement of the character described, the combination of a frame, a carrier, a series of soil-working members connected to said carrier, a pair of connecting-rods attached to said carrier and adjustably connected to said frame, and a pair of stay-rods attached to said carrier and adjustably connected to said frame, substantially as described.

5. In an agricultural implement of the character described, the combination of a frame, a cross-bar carried thereby, a carrier, a series of soil-working members connected to said carrier, a pair of apertured connecting-rods attached to said carrier, means whereby said rods are adjustably held to said cross-bar, a pair of stay-rods attached to said carrier, eyes on said frame in which said stay-rods are seated, and adjustment-nuts on said stay-rods at opposite sides to said eyes, substantially as described.

6. In an agricultural implement of the class described, the combination of a frame, a carrier connected to said frame, a series of soil-working members swingingly and independently connected to said carrier, and means whereby said soil-working members may be shifted to vary the angle thereof with relation to the ground in which they operate, substantially as described.

7. In an agricultural implement of the class described, the combination of a frame, a carrier connected to said frame, a series of hangers independently pivoted to said carrier, soil-working members journaled in said hangers, and means for rocking said hangers on their pivots to vary the angle of the soil-working members with relation to the ground in which they operate, substantially as described.

8. In an agricultural implement of the class described, the combination of a frame, a carrier connected to said frame, a series of hangers independently pivoted to said carrier, soil-working members mounted on said hangers, and a shift-bar arranged in engagement with said hangers and adapted to rock them on their pivots, substantially as described.

9. In an agricultural implement of the class described, the combination of a frame, a carrier connected thereto, a series of hangers independently pivoted to said carrier, soil-working members mounted on said hangers, and an adjustable slide-bar arranged in engagement with said hangers and adapted to shift said hangers in unison, substantially as described.

10. In an agricultural implement of the class described, the combination of a frame, a carrier connected to said frame, a series of hangers pivotally connected to said carrier, soil-working members mounted on said hangers, a notched slide-bar having engagement with said hangers, and means for adjusting said slide-bar, substantially as described.

11. In an agricultural implement of the class described, the combination of a frame, a carrier connected to said frame, a series of hangers pivotally connected to said carrier and provided with lugs, soil-working members mounted on said hangers, a notched slide-bar having engagement with the lugs of said journal members, and means for shifting said slide member longitudinally to rock said journal members in unison, substantially as described.

12. In an agricultural implement of the class described, the combination of a frame, a carrier connected to said frame, a series of soil-working members connected to said carrier at the rear side thereof, and restraining members connected to said carrier at the front side thereof, said last-named members being arranged to resist the longitudinal movement of said carrier, substantially as described.

13. In an agricultural implement of the class described, the combination of a frame, a carrier connected to said frame, a series of soil-working members connected to said carrier at the rear side thereof, and revoluble disks mounted upon said carrier at the front side thereof adapted to resist the longitudinal movement of said carrier incident to the strain exerted upon the soil-working members, substantially as described.

14. In an agricultural implement of the class described, the combination of a frame, a carrier connected to said frame and arranged at an angle to the path of travel of the implement, a series of soil-working members connected to said carrier, and a flexible stay connected to the rear end of said carrier and to said frame, substantially as described.

RICHARD J. GATLING.

In presence of—
E. S. KNIGHT,
M. P. SMITH.